UNITED STATES PATENT OFFICE.

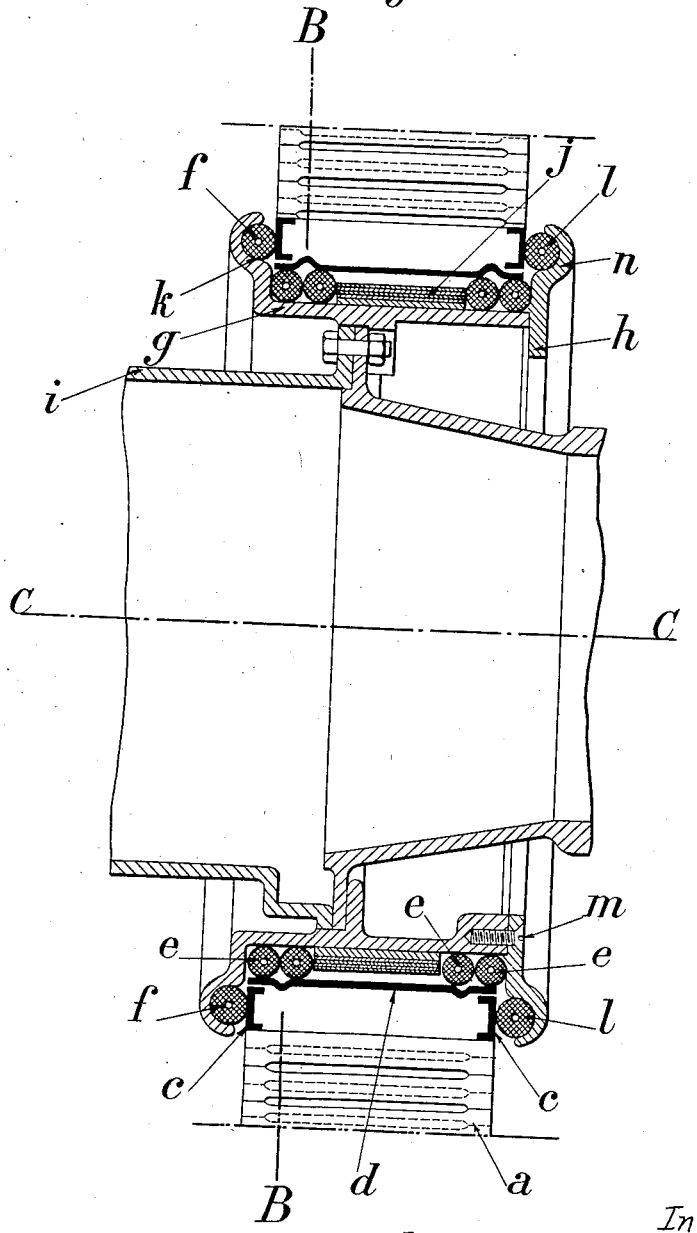

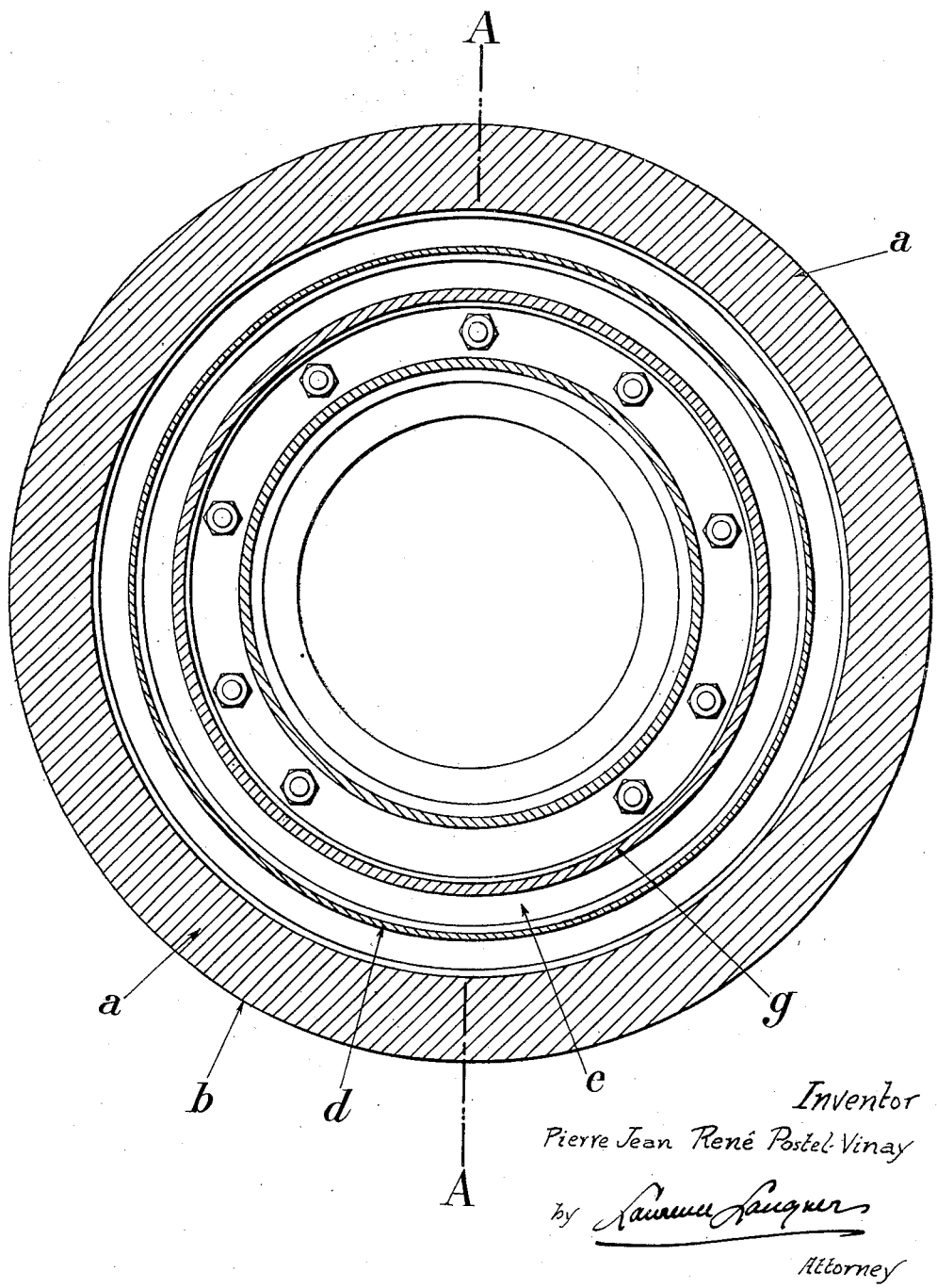

PIERRE JEAN RENÉ POSTEL-VINAY, OF PARIS, FRANCE, ASSIGNOR TO SOCIETE DES MOTEURS SALMSON (SYSTEME CANTON-UNNE), OF BILLANCOURT, SEINE, FRANCE.

SHOCK-ABSORBER FOR AIRPLANE-RADIATORS.

1,337,157.        Specification of Letters Patent.     Patented Apr. 13, 1920.

Application filed January 30, 1919. Serial No. 274,101.

*To all whom it may concern:*

Be it known that I, PIERRE JEAN RENÉ POSTEL-VINAY, citizen of the Republic of France, residing at 46 Boulevard de la Tour-Maubourg, Paris, Seine, in the Republic of France, have invented new and useful Improvements in Shock-Absorbers for Airplane-Radiators, of which the following is a specification.

The radiators or water coolers used in aviation are formed of very thin tubes of various form and cross section which present an important cooling surface. Said devices are very fragile owing to the presence of a considerable number of tubes which must be assembled by perfectly watertight joints. The coolers are subjected on air planes to important vibrations due to the engine and to shocks and jars resulting from sharp landings, which may soon cause leakage in the tubular bundle of the radiator.

The invention consists in the combination with an airplane radiator of a shock absorber or elastic suspension for the purpose of removing the radiator from the influence of the vibrations or jars. According to the invention, the radiator is preferably so mounted that it directly bears upon rubber rings arranged in a casing carried by the engine crank case.

In the annexed drawing, given by way of example:

Figure 1 is a longitudinal section along the line A—A, Fig. 2.

Fig. 2 is a section along the line B—B, Fig. 1.

As shown in the drawing, the water cooler or radiator *a* has an annular shape. It is supposed to be broken away outside of the circumference *b* and in Fig. 2, its section is diagrammatically shown by hatched lines. The inner surface of the radiator bundle is secured upon a rigid annular frame formed by front and rear plates, *c*, *c*, and an annular plate *d* which form at the same time a water tank. The annular plate *d* is supported by rubber rings *e* while the plates *c* bear against laterally arranged rubber rings *f*, *l*. The rubber rings *e*, *f* are mounted around a casing *g* secured to the crank case *i* of the engine. A cover *h* fixed to the casing *g* by screws *m* is used for securing the radiator in position and acts to compress the rings *f* and *l*. The rings *e*, the number of which may be varied according to the dimensions of the radiator, are held apart by means of a canvas band *j* wrapped around the casing *g*. It will be seen that the rings *f* and *l* are clamped within annular hooks *k* on the casing *g* and cover *h*, which avoids the use of any accessory part for securing said springs in position, such as collars, flanges, straps, bolts, etc. By this means, the radiator may be quickly and easily mounted and taken apart.

As will be seen by referring to Fig. 1, the longitudinal thrusts, in the direction of the axis C C of the engine will be taken up by the springs *f*, *l* while the thrust in the vertical direction will be responded to by a deformation of the rings *e*.

Having now described my invention, what I claim as new and desire to secure by Letters Patent is:

1. An elastic suspension for aeroplane radiators having an annular shape, comprising in combination a central support, annular yielding members surrounding said central support and thereby adapted to separate the radiator from the support, end thrust members adapted to prevent any movement of the radiator in an axial direction with respect to the central support and means for securing said end thrust members to the central support.

2. An elastic suspension for aeroplane radiators having an annular shape, comprising in combination a central support, annular yielding members surrounding said central support and thereby adapted to separate the radiator from the support, end thrust members adapted to prevent any movement of the radiator in an axial direction, means for securing said end thrust members to the central support and annular yielding means interposed between the radiator and the end thrust members.

3. The combination on an aeroplane of an annular casing placed about the crank case of the engine, means for rigidly connecting said annular casing to the crank case, a water cooler including a ring shaped water tank which is arranged about the said annular casing, rubber rings surrounding the casing and interposed between the latter and the water tank, rubber rings adapted to bear against the front and rear faces of the water tank and means for holding said rubber rings in a fixed position with respect to the casing.

4. The combination on an aeroplane of an annular casing placed about the crank case of the engine, means for rigidly connecting said annular casing to the crank case, a water cooler including a ring shaped water tank which is arranged about the said annular casing, rubber rings surrounding the casing and interposed between the latter and the water tank, rubber rings adapted to bear against the front and rear faces of the water tank, a ring shaped hook formed on the casing adapted to hold one of said latter rubber rings, a cover, means for removably securing said cover to the casing and a ring shaped hook formed on said removable cover and adapted to hold another of said latter rubber rings in position.

In testimony whereof I have signed my name to this specification.

PIERRE JEAN RENÉ POSTEL-VINAY.